April 15, 1924.

T. M. GLEASON

FAUCET

Filed Jan. 10, 1922

1,490,560

Witness!
Erwin B. Eiring

Inventor!
Thomas M. Gleason
By Young and Young
Attorneys!

Patented Apr. 15, 1924.

1,490,560

UNITED STATES PATENT OFFICE.

THOMAS M. GLEASON, OF RACINE, WISCONSIN.

FAUCET.

Application filed January 10, 1922. Serial No. 528,220.

*To all whom it may concern:*

Be it known that I, THOMAS M. GLEASON, a citizen of the United States, and resident of Racine, in the county of Racine and State of Wisconsin, have invented certain new and useful Improvements in Faucets; and I do hereby declare the following is a full, clear, and exact description thereof.

The invention comprises a hollow sleeve threaded internally to cooperate with a valve rod, a toothed head on the sleeve, a handle secured thereto and capable of having its adjustment varied so that it may always extend downwardly to the line of gravity, guides for the valve rod, and a valve adapted to be drawn by means of the guides in a straight line to a valve seat.

The object of the invention is the obviating of the defects of the Fuller faucet now in extensive use. This faucet utilizes an eccentric to draw the valve into position and the operation is such as to cause excessive wearing of the rubber of the valve by reason of the fact that it does not move to and fro in a straight line, but is directed laterally to an objectionable degree. In applicant's device the valve is reciprocated rectilinearly.

Another object is the provision of a toothed head whereby the handle may have its position varied and thus a means is afforded for taking up the wear or compression of the valve and the handle may be maintained permanently in a vertical position.

Additional objects are readiness of assembly, ease of manufacture, and simplicity of structure.

Figure 1:
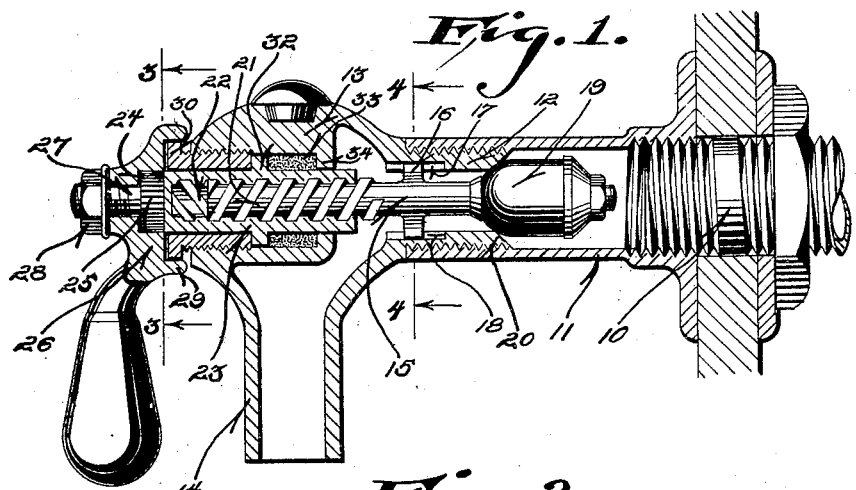

Reference is had to the accompanying drawings in which Figure 1 is a central vertical section of the invention.

Figure 2:
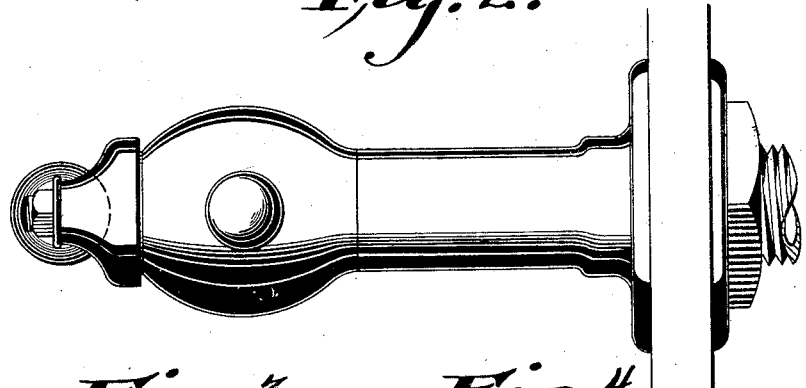

Figure 2 is a plan thereof.

Figure 3:
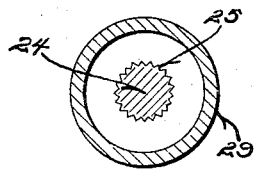
Figure 4:
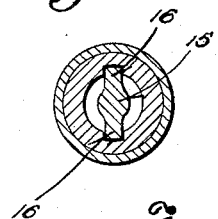

Figures 3 and 4 are cross sections on the lines 3—3 and 4—4, respectively, of Figure 1.

Pipe 10 is threaded into faucet sleeve 11, which is threaded internally at its other end to engage with the nipple 12 of casing 13 provided with a downwardly directed spout 14. Valve rod 15 is provided with laterally directed wings 16 received in slots 17 which terminate at shoulders 18 which serve to limit the movement in one direction of valve 19 so that it is never positioned so close to pipe 10 as to cut off the flow of water from pipe 10 to faucet sleeve 11. Valve seat 20 is provided to receive valve 19 and check the flow from faucet sleeve 11. The other end of valve rod 15 is provided with threads 21 cooperating with threads 22 of sleeve 23, the head 24 of which is closed and provided with teeth 25 adapted to make handle 26, which is provided with similar teeth, rigid with sleeve 23 an end extension 27 being directed through an opening in the handle 26, endwise movement of the handle being checked by a nut 28.

It is apparent that by removing nut 28 handle 26 may be disengaged from teeth 25 and rotated with respect to extension 27 and re-engaged in a different relationship, thus, no matter how great the wear on valve 19, handle 26 may always be maintained in a normal, vertical position. Handle 26 is provided with an inwardly directed flange 29 extending over a collar 30 on sleeve 31, threaded in engagement with casing 13 and contacting with shoulder 32 integral with sleeve 23. Packing 33 is positioned in casing 13 between shoulder 32 and flange 34.

When it is desired to turn on water, handle 26 is rotated, causing the sleeve 23 to turn and thus move valve rod 15 through the medium of threads 21 and 22. Valve rod 15 does not rotate with handle 26 and wings 16 guide it so that valve 19 proceeds rearwardly in a straight line until wings 16 contact with shoulders 18. There is no tendency for sleeve 23 to move forwardly since sleeve 31 contacting with collar 32 counteracts such tendency.

My invention is capable of embodiment in diverse ways and I do not limit myself to the specific one described, but contemplate a substantial range of equivalents within the scope of the appended claim.

I claim:—

A faucet comprising a body portion having an internally threaded outer end, an inlet portion and a delivery portion, a housing projecting into said body portion adjacent said internally threaded portion, an internally threaded sleeve projecting through said housing and having a shoulder, packing interposed between said housing and said shoulder, a threaded gland screwed into the internally threaded portion of said body portion and bearing against said shoulder, an external handle secured to said sleeve and adapted to rotate said sleeve, a spindle slidably carried within said body portion and having ears cooperating with said body portion to prevent rotation of said spindle, said spindle having at one end a shank screwed into said internally threaded sleeve, and having at the other end a valve cooperating with said inlet portion of said faucet, said inlet portion being formed of two detachable parts adjacent said valve.

In testimony that I claim the foregoing I have hereunto set my hand at Racine, in the county of Racine and State of Wisconsin.

THOMAS M. GLEASON.